United States Patent
Shiohara

(10) Patent No.: US 11,475,771 B2
(45) Date of Patent: Oct. 18, 2022

(54) IMAGE DISPLAY SYSTEM AND RIDING DEVICE

(71) Applicant: SEIKO EPSON CORPORATION, Tokyo (JP)

(72) Inventor: Ryuichi Shiohara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 166 days.

(21) Appl. No.: 16/857,411

(22) Filed: Apr. 24, 2020

(65) Prior Publication Data

US 2020/0250985 A1    Aug. 6, 2020

Related U.S. Application Data

(63) Continuation of application No. 15/886,224, filed on Feb. 1, 2018, now Pat. No. 10,672,276.

(30) Foreign Application Priority Data

Feb. 7, 2017    (JP) .............. JP2017-020133

(51) Int. Cl.
*G08G 1/16* (2006.01)
*B60R 11/04* (2006.01)
(Continued)

(52) U.S. Cl.
CPC .......... *G08G 1/166* (2013.01); *B60R 1/00* (2013.01); *B60R 11/04* (2013.01); *G06V 20/588* (2022.01);
(Continued)

(58) Field of Classification Search
CPC . G08G 1/166; G08G 1/01; B60R 1/00; B60R 11/04; B60R 2300/105;
(Continued)

(56) References Cited

U.S. PATENT DOCUMENTS

2016/0325680 A1* 11/2016 Curtis .................. B60R 1/00
2017/0225621 A1    8/2017 Shiohara
2017/0237882 A1    8/2017 Shiohara

FOREIGN PATENT DOCUMENTS

JP    2007-129290 A    5/2007
JP    2009-152966 A    7/2009
(Continued)

OTHER PUBLICATIONS

Jul. 3, 2018 Extended European Search Report issued in European Patent Application No. 18155536.8.
(Continued)

*Primary Examiner* — James M Pontius
(74) *Attorney, Agent, or Firm* — Oliff PLC

(57) ABSTRACT

An imaging display system including an imaging unit that images an image of outside of a riding device and outputs a video signal that indicates the image, a video signal processing unit that receives the video signal from the imaging unit and outputs a digital video signal based on the video signal that has been received, a central signal processing unit that receives the digital video signal from the video signal processing unit via a transmission line in the riding device, a display control unit that receives the digital video signal from the video signal processing unit, generates a display signal from the digital video signal that has been received, and outputs the display signal, and a display unit that displays an image that is indicated by the display signal that has been received from the display control unit is configured.

20 Claims, 7 Drawing Sheets

(51) Int. Cl.
 *H04N 7/18* (2006.01)
 *G08G 1/01* (2006.01)
 *B60R 1/00* (2022.01)
 *G06V 20/56* (2022.01)
(52) U.S. Cl.
 CPC ............... *G08G 1/01* (2013.01); *H04N 7/18* (2013.01); *H04N 7/181* (2013.01); *B60R 2300/105* (2013.01); *B60R 2300/30* (2013.01); *G06T 2207/30252* (2013.01)
(58) Field of Classification Search
 CPC .. B60R 2300/30; G06K 9/00798; H04N 7/18; H04N 7/181; G06T 2207/30252
 See application file for complete search history.

(56) References Cited

FOREIGN PATENT DOCUMENTS

| | | |
|---|---|---|
| JP | 2016-040163 A | 3/2016 |
| JP | 2016-040904 A | 3/2016 |
| WO | 2016/093117 A1 | 6/2016 |
| WO | 2016/179303 A1 | 11/2016 |

OTHER PUBLICATIONS

Apr. 5, 2019 Office Action issued in U.S. Appl. No. 15/886,224.
Oct. 21, 2019 Office Action Issued in U.S. Appl. No. 15/886,224.

\* cited by examiner

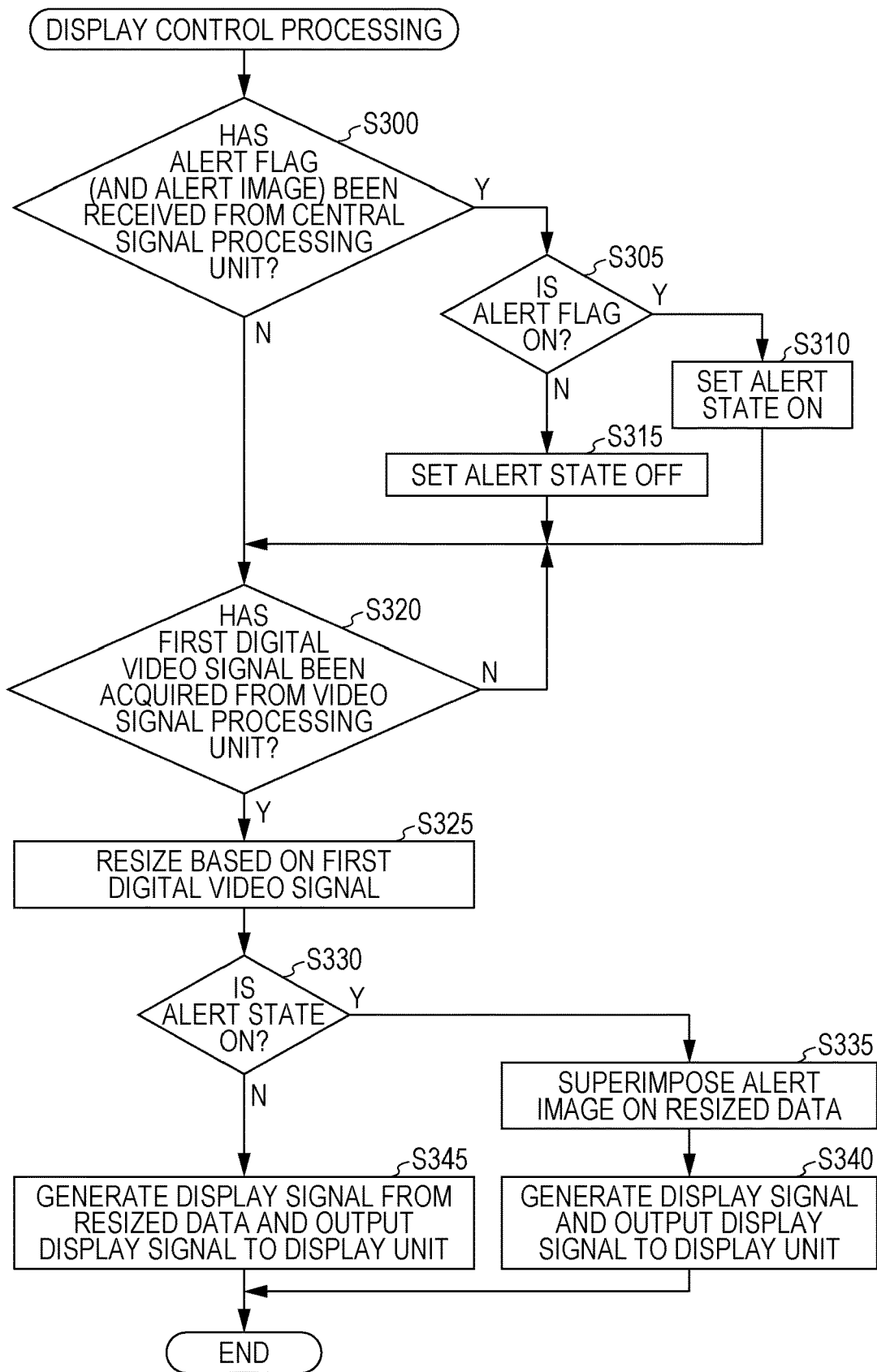

IMAGE DISPLAY SYSTEM AND RIDING DEVICE

This is a Continuation of application Ser. No. 15/886,224 filed Feb. 1, 2018, which claims the benefit of Japanese Priority Application No. 2017-020133 filed Feb. 7, 2017. The disclosure of each of the prior applications is hereby incorporated by reference herein in its entirety.

BACKGROUND

1. Technical Field

The present invention relates to an imaging display system and a driving device.

2. Related Art

Conventionally, a so-called mirrorless car which has, instead of mirrors provided to a vehicle, a configuration in which an image obtained by imaging outside of the vehicle is displayed on a display unit has been known. In a mirrorless car, a display delay that is a time which it takes to perform imaging to display is preferably as shot as possible. In JP-A-2016-40904, a technology in which a display delay is reduced in a configuration in which outside of a vehicle is photographed by a plurality of imaging devices and photographed images are separately displayed in different areas of a single display unit is described. In JP-A-2007-129290, it is described that a top view image generated by using images photographed by a plurality of imaging devices is displayed on a single display unit.

SUMMARY

An advantage of some aspects of the invention is that, if it is enabled to display an image that has been imaged by each of a plurality of imaging devices on a display unit that corresponds to the each of the imaging devices in a state in which a display delay is as short as possible and to perform advanced processing using the images that have been imaged by the plurality of imaging devices, convenience of a riding device is further increased.

It is therefore an object of the invention to increase convenience of a riding device.

An imaging display system that has been devised in order to achieve the above-described object includes an imaging unit that images an image of outside of a riding device and outputs a video signal that indicates the image, a video signal processing unit that receives the video signal from the imaging unit and outputs a digital video signal based on the video signal that has been received, a central signal processing unit that receives the digital video signal from the video signal processing unit via a transmission line in the riding device, a display control unit that receives the digital video signal from the video signal processing unit, generates a display signal from the digital video signal that has been received, and outputs the display signal, and a display unit that displays an image that is indicated by the display signal that has been received from the display control unit.

With the above-described configuration, it is possible, in addition to merely display an imaged image on the display unit, to transmit the imaged image to the central signal processing unit. Therefore, it is possible to cause the central signal processing unit to execute advanced processing, such as image recognition processing or the like, using the transmitted image. Therefore, the video signal processing unit and the display control unit of this configuration are able to cause the display unit to display the image such that a display delay from imaging to display is not increased due to an influence of high load processing, such as image recognition processing or the like.

In the imaging display system that has been devised in order to achieve the above-described object, a configuration in which the digital video signal that is output by the video signal processing unit includes a first digital video signal that is transmitted to the display control unit and a second digital video signal that is transmitted to the central signal processing unit, and the first digital video signal and the second digital video signal are different from one another may be employed.

With this configuration, the display control unit is able to perform display control processing using the first digital signal and the central signal processing unit is able to perform predetermined signal processing using the second digital signal.

In the imaging display system that has been devised in order to achieve the above-described object, a configuration in which a range of the image that is indicated by the first digital video image is partially different from a range of the image that is indicated by the second digital video signal may be employed.

With this configuration, the video signal processing unit is able to transmit an image that corresponds to an angle of view which is displayed on the display unit to the display control unit, and is able to transmit an image an angle of view of which is partially different from an angle of view which is displayed on the display unit. As a result, the central signal processing unit is able to perform processing using the image.

In the imaging display system that has been devised in order to achieve the above-described object, a configuration in which the video signal processing unit receives the video signal from the imaging unit not via the transmission line in the riding device may be employed.

With this configuration, transmission of the video signal from the imaging unit to the video signal processing unit is performed not via the transmission line in the riding device, and therefore, a display delay that is a time which it takes to perform imaging to display may be reduced, as compared to a case in which transmission of the video signal from the imaging unit to the video signal processing unit is performed via the transmission line in the riding device.

In the imaging display system that has been devised in order to achieve the above-described object, a configuration in which the display control unit receives the digital video signal from the video signal processing unit not via the transmission line in the riding device may be employed.

With this configuration, transmission of the digital video signal from the video signal processing unit to the display control unit is performed not via the transmission line in the riding device, and therefore, a display delay that is a time which it takes to perform imaging to display may be reduced, as compared to a case in which transmission of the digital video signal from the video signal processing unit to the display control unit is performed via the transmission line in the riding device.

In the imaging display system that has been devised in order to achieve the above-described object, a configuration in which the display unit receives the display signal from the display control unit not via the transmission line in the riding device may be employed.

With this configuration, transmission of the display signal from the display control unit to the display unit is performed not via the transmission line in the riding device, and therefore, a display delay that is a time which it takes to perform imaging to display may be reduced, as compared to a case in which transmission of the display signal from the display control unit to the display unit is performed via the transmission line in the riding device.

In the imaging display system that has been devised in order to achieve the above-described object, a configuration in which the central signal processing unit generates a third digital video signal related to the digital video signal that has been received from the video signal processing unit and outputs the third digital video signal to the display control unit via the transmission line in the riding device, and the display control unit generates the display signal, based on the digital video signal that has been received from the video signal processing unit and the third digital video signal, and outputs the display signal to the display unit may be employed.

With this configuration, the display control unit is able to cause the display device to display the display signal based on the third digital video signal that has been generated as a result of processing of the central signal processing unit.

In the imaging display system that has been devised in order to achieve the above-described object, a configuration in which the display control unit superimposes the third digital video signal on the digital video signal that has been received from the video signal processing unit to generate the display signal may be employed.

With this configuration, the display control unit is able to cause the display unit to display the third digital video signal that has been generated as a result of processing of the central signal processing unit.

In the imaging display system that has been devised in order to achieve the above-described object, the video signal processing unit, the display control unit, and the display unit may be integrally configured and the video signal processing unit and the central signal processing unit may be coupled to one another via a cable that forms the transmission line in the riding device.

With this configuration, it is possible to reduce the occurrence of a transmission delay depending on a length of a transmission line between each of the video signal processing unit, the display control unit, and the display unit and another one of the units.

In the imaging display system that has been devised in order to achieve the above-described object, a configuration in which a distance between each of the video signal processing unit, the display control unit, and the display unit and another one of the units is shorter than a distance between each of the video signal processing unit, the display control unit, and the display unit and the central signal processing unit may be employed.

With this configuration, the video signal processing unit, the display control unit, and the display unit are arranged close to one another, and therefore, it is possible to reduce the occurrence of a transmission delay depending on a length of a transmission line between each of the video signal processing unit, the display control unit, and the display unit and another one of the units.

The imaging display system that has been devised in order to achieve the above-described object may further include a plurality of imaging device units each of which includes at least the imaging unit and the video signal processing unit. In that case, a configuration in which the central signal processing unit receives the digital video signal that has been output from each of the video signal processing units of the plurality of imaging device units via the transmission line in the riding device, generates a related signal related to the plurality of digital video signals which have been received, and outputs the related signal via the transmission line in the riding device may be employed.

With this configuration, it is possible to generate and output the related signal used for performing various types of processing using a plurality of digital video signals.

A riding device that has been devised in order to achieve the above-described object includes the imaging display system having at least one of the above-described configurations. With the configuration, an image that has been imaged by the imaging unit may be displayed on the display unit such that a display delay is not increased. Also, advanced processing, such as image recognition processing or the like, using the image that has been imaged by the imaging unit may be performed. Therefore, a highly convenient riding device may be provided.

BRIEF DESCRIPTION OF THE DRAWINGS

The invention will be described with reference to the accompanying drawings, wherein like numbers reference like elements.

FIG. 7 is a flowchart illustrating display control processing.

DESCRIPTION OF EXEMPLARY EMBODIMENTS

Figure 1:
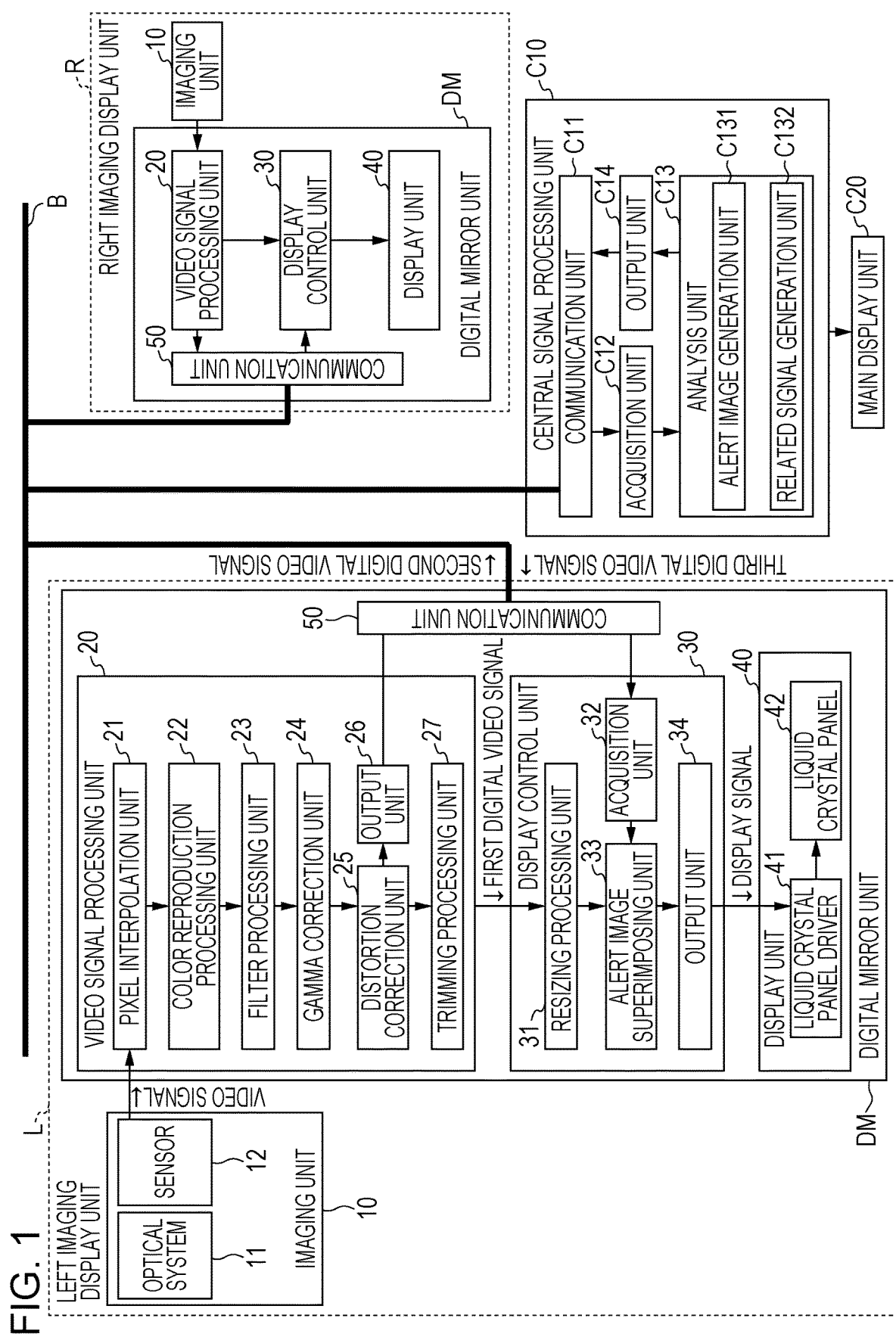
FIG. 1 is a block diagram illustrating a configuration of an imaging display system.

Embodiments of the invention will be described below with reference to the accompanying drawings. Note that, in the drawings, components that correspond to one another are provided with the same reference symbol and an overlapping description will not be repeated.

1. First Embodiment 1-1. Configuration of Imaging Display System

Figure 2:
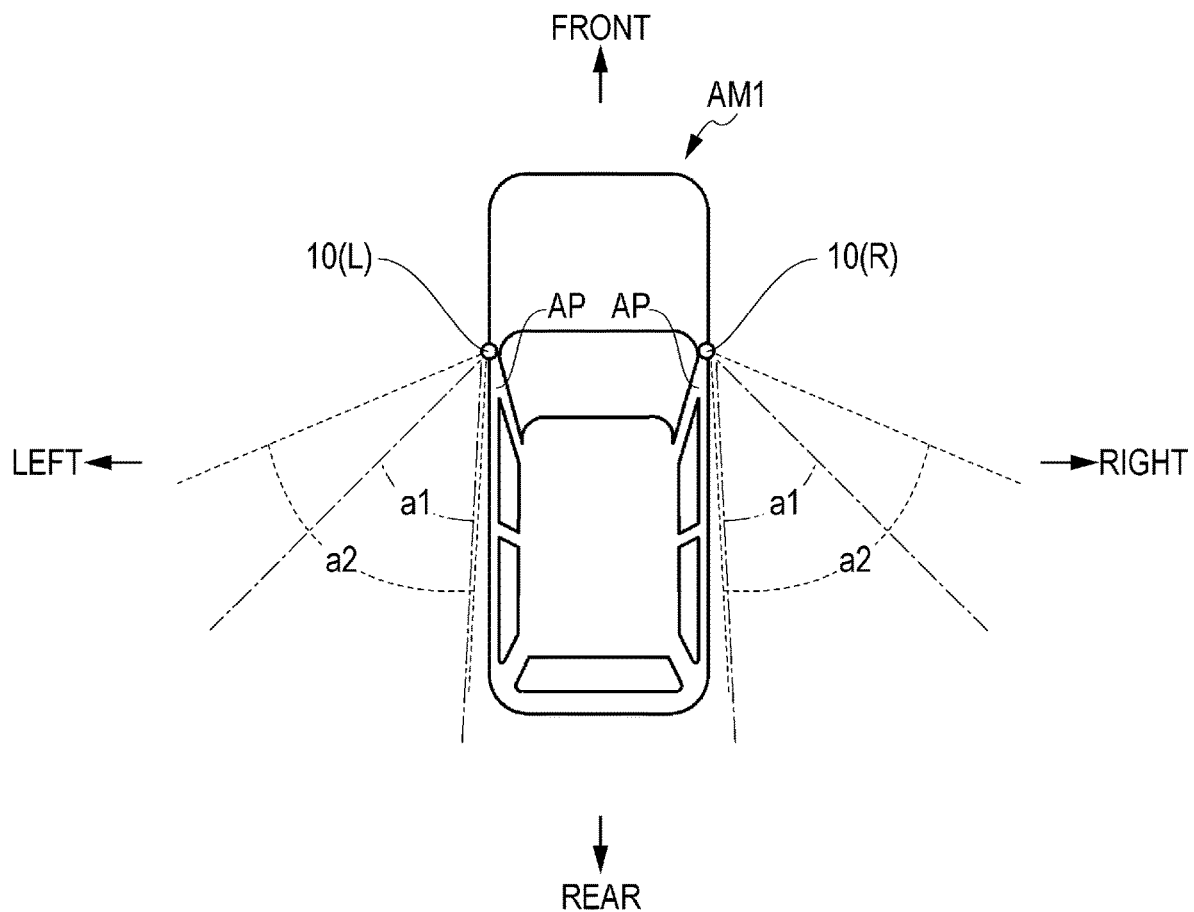
FIG. 2 is a schematic view illustrating an automobile in which an imaging display system is mounted.

FIG. 1 is a block diagram illustrating a schematic configuration of an imaging display system 1 in a first embodiment. The imaging display system 1 is a system that displays an image that is used for driving assistance when a driver drives an automobile as a riding device and is mounted in the automobile. FIG. 2 is a schematic view illustrating an automobile AM1 in which the imaging display system 1 is mounted.

As illustrated in FIG. 1, the imaging display system 1 includes a left imaging display unit L, a central signal processing unit C10, and a right imaging display unit R. Each of the left imaging display unit L, the central signal processing unit C10, and the right imaging display unit R is coupled to a bus B and transfer of a signal between the units are performed via the bust B. The bus B corresponds to a transmission line in a riding device in this embodiment. A communication via the bus B is performed in accordance with a protocol of an onboard network, such as, for example, a controller area network (CAN), Ethernet AVB, or the like. In this embodiment, a drive assistance control unit (not illustrated), which will be described later, is also coupled to the bus B. In addition to the above-described units, a control unit (an electronic control unit (ECU)) which has various functions may be coupled to the bus B. In the bus B, various signals that are transferred between a plurality of ECUs coupled to the bus B are transmitted at various timings. Therefore, for example, when signals are simultaneously output from the plurality of ECUs, an arbitration in which transmission rights are granted to the ECUs in the order of descending priorities that have been set in advance, or the like, is performed. Therefore, there is a probability that, in the ECUs coupled to the bus B, a waiting time from a time when preparation for transmitting a signal is completed to a time when transmission of the signal is actually started.

Each of the left imaging display unit L and the right imaging display unit R includes an imaging unit 10, a video signal processing unit 20, a display control unit 30, a display unit 40, and a communication unit 50. Each of the imaging unit 10, the video signal processing unit 20, the display control unit 30, the display unit 40, and the communication unit 50 included in each of the left imaging display unit L and the right imaging display unit R has the same configuration as the corresponding one in the other one of the units in the left imaging display unit L and the right imaging display unit R. In this embodiment, transmission of each of a signal from the imaging unit 10 to the video signal processing unit 20, a signal from the video signal processing unit 20 to the display control unit 30, and a signal from the display control unit 30 to the display unit 40 is performed via an exclusive transmission line that is different from the bus B. In the exclusive transmission line, transmission of a signal between predetermined electronic parts (between electronic parts in one-to-one correspondence in this embodiment) is performed. Therefore, the above-described waiting time provided to avoid a collision does not occur.

1-2. Imaging Unit

The imaging unit 10 includes an optical system 11 and a sensor 12 in order to image an image of outside of the automobile AM1 and output a video signal that indicates the image. The optical system includes a lens that forms an image of a subject, a diaphragm, a shutter, and an infrared cut filter. As the sensor 12 (an area image sensor), a solid-state imaging device, such as a complementary metal oxide semiconductor (COMS) image sensor, a charge coupled device (CCD) image sensor, or the like, which includes color filters arranged in a Bayer array and a plurality of photodiodes that store electric charges in accordance with a light amount by photoelectric conversion for each pixel, is used.

A location of a pixel of the sensor 12 is defined by coordinates in a rectangular coordinate system, a line is formed by a plurality of pixels arranged in a direction parallel to one of coordinate axes, and a plurality of lines are formed so as to be arranged in a direction parallel to the other one of the coordinate axes. A direction parallel to a line and a direction perpendicular to the line are herein called horizontal direction and vertical direction, respectively. One screen configured of all of pixels of the sensor 12 is called one frame.

1-3. Video Signal Processing Unit

The video signal processing unit 20 receives a video signal that has been output from the sensor 12 of the imaging unit 10 via an exclusive transmission line that is not the bus B, generates a first digital video signal based on the video signal, and outputs the first digital video signal to the display control unit 30 via an exclusive transmission line that is not the bus B. Also, the video signal processing unit 20 generates a second digital video signal based on the video signal and outputs the second digital video signal to the central signal processing unit C10 via the bus B. In order to perform the above-described generation and output of signals, the video signal processing unit 20 includes a pixel interpolation unit 21, a color reproduction processing unit 22, a filter processing unit 23, a gamma correction unit 24, a distortion correction unit 25, an output unit 26, and a trimming processing unit 27. The video signal processing unit 20 performs processing in each step by pipeline processing appropriately using a line buffer (not illustrated) for a plurality of lines, which has been ensured in advance.

The video signal that has been output from the sensor 12 is temporarily recorded in a first line buffer (not illustrated). While retrieving data of a necessary number of pixels for generating colors of two channels which are lacked in each pixel in the Bayer array from the first line buffer, the pixel interpolation unit 21 performs interpolation processing to generate the colors of the two channels. As a result, data of three channels is generated in each pixel. Next, the color reproduction processing unit 22 performs color conversion processing that is used for reproducing a color by performing a matrix operation of 3×3, based on the generated data. The data that has been generated by color conversion processing is temporarily recorded in a second line buffer (not illustrated).

Next, the filter processing unit 23 executes sharpness adjustment, noise elimination processing, or the like by filter processing. Next, the gamma correction unit 24 executes gamma correction in which a characteristic difference between a color indicated by a gradation value of output data of the sensor 12 and a color indicated by a gradation value of data handled in the display unit 40 is compensated. Data that has been generated by gamma correction is temporarily recorded in a third line buffer (not illustrated). The distortion correction unit 25 executes correction processing for a distortion due to a characteristic of a lens of the optical system 11 on the data recorded in the third line buffer and temporarily records the corrected data in a fourth line buffer (not illustrated). The trimming processing unit 27 performs trimming processing, based on the data recorded in the fourth line buffer and outputs the data that has undergone trimming processing to the display control unit 30. The data that is output to the display control unit 30 corresponds to a first digital video signal.

The output unit 26 causes the central signal processing unit C10 to transmit, by the communication unit 50, data that has undergone processing of the distortion correction unit 25 but has not been trimmed yet by the trimming processing unit 27 and is to be recorded in a line-sequential manner in the fourth line buffer. The communication unit 50 includes an interface circuit used for communicating with another electronic part coupled to the bus B via the bus B. Data that is recorded in the fourth line buffer, has undergone distortion correction processing, and has not undergone trimming processing yet is output to the bus B in a state of being converted to a format suitable for a communication via the bus B by the output unit 26 and the communication unit 50. For example, the data recorded in the fourth line buffer is compressed and is converted to a packet in a format in accordance with a protocol of a communication via the bus B. The data in the above-described converted state corresponds to the second digital video signal. An image indicated by the second digital video signal that is transmitted to the central signal processing unit C10 includes an image indicated by the first digital video signal which is transmitted to the display control unit 30 and corresponds to a broader range than that of the first digital video signal.

The display control unit 30 includes a resizing processing unit 31, an acquisition unit 32, an alert image superimposing unit 33, and an output unit 34. Data that has been output from trimming processing unit 27 is temporarily recorded in a fifth line buffer (not illustrated). The resizing processing unit 31 performs size reduction processing in accordance with a size of a liquid crystal panel 42 of the display unit 40, based on the data (the first digital video signal) recorded in the fifth line buffer. Data generated as a result of size reduction processing by the resizing processing unit 31 is temporarily recorded in a line-sequential manner in a sixth line buffer (not illustrated).

The communication unit 50 receives data including an alert image (a third digital video signal) from the central signal processing unit C10 via the bus B. Each of the communication unit 50 and the acquisition unit 32 acquires an alert flag from the received data. An alert flag that has been acquired by the left imaging display unit L is a flag that indicates whether or not it is necessary to display the alert image on the display unit 40 of the left imaging display unit L, as a result of processing by the central signal processing unit C10. The alert flag that has been acquired by the right imaging display unit R is a flag that indicates whether or not it is necessary to display an alert image on the display unit 40 of the right imaging display unit R, as a result of processing by the central signal processing unit C10. An alert flag is set on if it is necessary to display an alert image, and is set off if it is not necessary to do so. Also, if an alert flag is on, each of the communication unit 50 and the acquisition unit 32 acquires an alert image from the received data (including extension processing for compressed data) and temporarily records the alert image in a frame buffer (not illustrated). The alert flag is regularly transmitted from the central signal processing unit C10 in frame units. If an alert flag is on, an alert image is transmitted from the central signal processing unit C10 in synchronization with the alert flag.

When the alert image superimposing unit 33 acquires an alert flag that has been set on from the central signal processing unit C10, the alert image superimposing unit 33 updates an alert state in the alert image superimposing unit 33 to on. Also, when the alert image superimposing unit 33 acquires an alert flag that has been set off from the central signal processing unit C10, the alert image superimposing unit 33 updates the alert state to off. If the alert state is on, the alert image superimposing unit 33 superimposes, on data of one line, which has been generated by the resizing processing unit 31 and is temporarily recorded in the sixth line, data of the line in the alert image which has been recorded in the frame buffer and temporarily records the data achieved by the above-described superimposition in a seventh line buffer (not illustrated). Note that, if the alert state is off, the alert image superimposing unit 33 outputs data that has been recorded in the sixth line buffer and has undergone processing by the resizing processing unit 31 to the seventh line buffer without superimposing the alert image. The output unit 34 outputs data in line units, which is recorded in the seventh line buffer, in a state of being horizontally flipped to the display unit 40 not via the bus B (but via an exclusive transmission line that is not the bus B). The horizontally flipped data is output to the display unit 40, and thereby, similar to a known side mirror, a mirror image may be displayed on the display unit 40. Note that data that is output from the output unit 34 to the display unit 40 corresponds to a display signal.

1-4. Display Unit

The display unit 40 includes a liquid crystal panel driver 41 and the liquid crystal panel 42. The liquid crystal panel driver 41 applies a voltage to each subpixel and outputs a signal that drives a liquid crystal to the liquid crystal panel 42, based on the display signal that has been acquired from the output unit 34. The liquid crystal panel 42 includes a gate driver and a source driver (not illustrated), the gate driver controls a display timing in each pixel of each line in accordance with a signal that is output from the liquid crystal panel driver 41, and the source driver applies a voltage that corresponds to image data of each pixel to each pixel of a line which is at the display timing, thereby performing display. Note that the display unit 40 is not limited to a liquid crystal panel and a display panel of some other type, such as an organic light emitting diode (OLED) or the like, may be employed.

In the imaging unit 10, the video signal processing unit 20, the display control unit 30, and the display unit 40 of this embodiment, imaging to generation of a display signal are performed by pipeline processing in a line-sequential manner. The alert image superimposing unit 33 is configured to perform display of an Nth line in synchronization with a timing at which output of image data of the Nth line (N is a natural number) in the vertical direction in the liquid crystal panel 42 has ended. Specifically, a timing generator (not illustrated) included in a digital mirror unit DM acquires progress information that indicates a line in which generation of data in the alert image superimposing unit 33 has ended from the alert image superimposing unit 33. According to the progress information, it is possible to specify a line for which display in the liquid crystal panel 42 has been enabled. The timing generator outputs a horizontal synchronization signal in synchronization with a timing at which generation of data of each line has ended, and thereby, display of the line for which generation of the data has ended is started in the liquid crystal panel 42. As described above, a display timing of each line is controlled, and thereby, it is enabled to start display of each line not before preparation for display of data is completed but immediately after preparation for display of each line is completed. In this embodiment, reduction of a time (a display delay) which it takes to perform imaging by the imaging unit 10 to display by the display unit 40 is realized in the above-described manner.

1-5. Central Signal Processing Unit

The central signal processing unit C10 realizes a function of analyzing an image indicated by the second digital video signal that has been received from each of the left and right imaging display units, generating, if an event of an alert target has been detected from the second digital video signal, an alert image that is superimposed and displayed on the liquid crystal panel 42, and transmitting the alert image to the corresponding imaging display unit. Also, the central signal processing unit C10 realizes a function of generating a related signal that is related to drive assistance, based on the second digital video signal that has been received from each of the left and right imaging display units and outputting the related signal to the drive assistance control unit (not illustrated). In order to realize the above-described functions, the central signal processing unit C10 includes a communication unit C11, an acquisition unit C12, an analysis unit C13 (including an alert image generation unit C131 and a related signal generation unit C132), and an output unit C14.

The communication unit C11 includes an interface circuit that is used for communicating with another electronic part via the bus B. The acquisition unit C12 acquires the second digital video signal from data that has been received by the communication unit C11 from the left imaging display unit L and temporarily records the second digital video signal in the frame buffer (not illustrated). Also, the acquisition unit C12 acquires the second digital video signal from data that has been received by the communication unit C11 from the right imaging display unit R and temporarily records the second digital video signal in the frame buffer (not illustrated).

The analysis unit C13 analyzes an image indicated by the second digital video signal that has been acquired by the acquisition unit C12 and is temporarily recorded in the frame buffer and determines whether or not an event of an alert target has been detected. Also, the analysis unit C13 analyzes an image indicated by the second digital video signal that has been acquired by the acquisition unit C12 and is temporarily recorded in the frame buffer and determines whether or not an event of an alert target has been detected. For example, a characteristic of an object of an alert target has been defined in advance and, when processing used for detecting the characteristic is performed by image processing and an object suitable for the characteristic is detected, the analysis unit C13 determines that an event of an alert target has been detected. The analysis unit C13 performs determination on whether or not an event of an alert target has been detected in synchronization with an acquisition cycle of an image (the second digital video signal) of, for example, one frame. If an event of an alert target has not been detected, the analysis unit C13 sets the alert flag off and causes the output unit C14 to transmit the alert flag to the left imaging display unit L or the right imaging display unit R. The output unit C14 converts data of a transmission target to a format suitable for a communication via the bus B and outputs the converted data to the communication unit C11. The communication unit C11 transmits data that indicates the alert flag in accordance with the communication protocol of the bus B to the left or right imaging display unit via the bus B.

If an event of an alert target has been detected, the analysis unit C13 sets the alert flag on. Also, the alert image generation unit C13l generates an alert image. Specifically, for example, if another vehicle (an alert target vehicle AM2) that is approaching from a right rear side of the automobile AM1 is detected, based on images of a plurality of consecutive frames, the alert image generation unit C13l generates an alert image that indicates a character string, such as, for example, "KEEP YOUR EYES BEHIND!" or the like. In the display unit 40, an image that has been imaged by the imaging unit 10 is horizontally flipped and is displayed, and therefore, when the image is displayed on the display unit 40, the alert image generation unit C131 generates an image in a state in which the character string is horizontally flipped such that characters are correctly displayed as an alert image and outputs the alert image to the output unit C14. The output unit C14 outputs the alert flag that has been set on and the alert image to the communication unit C11 to cause the communication unit C11 to transmit the alert flag and the alert image to the right imaging display unit R. Note that the analysis unit C13 may be configured to generate an alarm sound from a speaker (not illustrated) inside a vehicle as well as to set the alert flag on. In this case, the type of sound may be differed between a case in which an event of an alert target has been detected in a left rear side and a case in which an event of an alert target has been detected in a right rear side to enable a driver to identify left and right. Also, a voice (a word(s)), instead of the alarm sound, may be output from the speaker. Thus, an alert may be conveyed to the driver by both of a sound and display, and therefore, convenience and safety of the riding device may be further increased.

Also, the analysis unit C13 has a function of acquiring information that is necessary for drive assistance control from an image. For example, the analysis unit C13 calculates a distance in the image between an object and the automobile AM1 in the image and specifies a distance in a real world, which corresponds to the distance in the image. As the object, for example, a line on a road surface, which defines a lane boundary line, a stop line on the road surface, another vehicle, a pedestrian, a facility, or the like may be assumed. In the related signal generation unit C132, a related signal that indicates a distance between the object and the automobile AM1 in the real world is generated and is transmitted to the drive assistance control unit (not illustrated) via the output unit C14 and the communication unit C11. In the drive assistance control unit, an assistance content may be determined based on the received related information and travel of the automobile AM1 may be controlled in accordance with the assistance content.

Note that, in this embodiment, in order to realize, as a drive assistance, a driving traffic lane maintaining function, a location of the automobile AM1 in a direction orthogonal to a direction in which a driving traffic lane extends is derived by analyzing the second digital video signal. The analysis unit C13 specifies a first distance that is a distance from a line on the road surface, which indicates a left end of the driving traffic lane to a left end of a vehicle body of the automobile AM1 in the real world and a second distance that is a distance from a line on the road surface, which indicates a right end of the driving traffic lane to a right end of the vehicle body of the automobile AM1 in the real world, based on an image indicated by the second digital video signal. The related signal generation unit C132 generates a related signal including the first distance and the second distance and transmits the related signal to the drive assistance control unit (not illustrated) via the output unit C14 and the communication unit C11. The drive assistance control unit controls a steering angle such that the automobile AM1 does not depart from the driving traffic lane, based on the related signal.

1-6. Arrangement of Imaging Unit and Arrangement of Digital Mirror Unit

Figure 3:
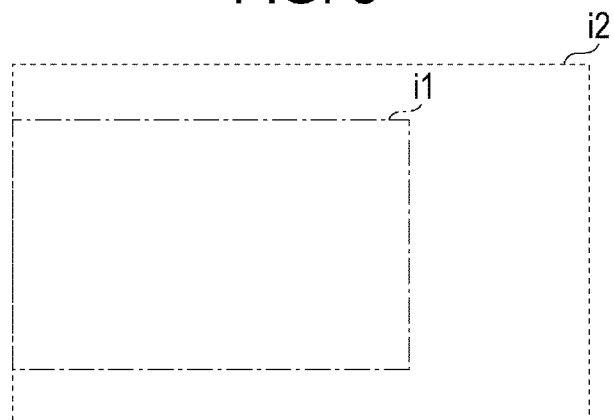
FIG. 3 is a schematic view illustrating a first digital video image signal and a second digital video image signal.

FIG. 2 illustrates an arrangement of the imaging unit 10 and an imaging range thereof. As illustrated in FIG. 2, in the automobile AM1 in which the imaging display system 1 is mounted, the imaging unit 10 of the left imaging display unit L is provided in a location outside a vehicle, which includes at least a left rear side of the automobile AM1 as an imaging range and is in the vicinity of a left side A pillar. Also, the imaging unit 10 of the right imaging display unit R is provided in a location outside the vehicle, which includes at least a right rear side of the automobile AM1 as an imaging range and is in the vicinity of a right side A pillar. An angle of view a2 indicates a range of an image indicated by the second digital video signal. An angle of view a1 indicates a range of an image indicated by the first digital video signal. FIG. 3 illustrates an image i2 of one frame, which is indicated by the second digital video signal, and an image i1 of one frame, which is indicated by the first digital video signal in the left imaging display unit L. That is, in the trimming processing unit 27 of the left imaging display unit L, the image i1 is trimmed relative to the image i2. As described above, in the central signal processing unit C10, it is possible to perform image analysis processing on an image which has a broader range than the range displayed on the display unit 40. Therefore, for example, it is also possible to detect an alert event in a range which is not included in an imaging range of the liquid crystal panel 42 yet in an early stage, give an alert to the driver, or the like.

Note that the central signal processing unit C10 acquires display target area information that indicates size and shape of the image i1 and a location of the image i1 relative to the image i2 in advance. For example, the central signal processing unit C10 acquires the display target area information that has been designed and set in advance in accordance with a type of the vehicle in which the imaging unit 10 is mounted at the time of a startup of the central signal processing unit C10. Also, a range of the image i1 relative to the image i2 may be adjustable by the driver. For example, the range may be adjustable by operating a four-direction button or a stick (not illustrated) provided in a door, an instrument panel, or the like at a driver☐s seat side. Also, an adjustment unit used for adjusting an angle of view of each of left and right in an adjustment step at the time of shipment of automobile may be provided.

Figure 4:
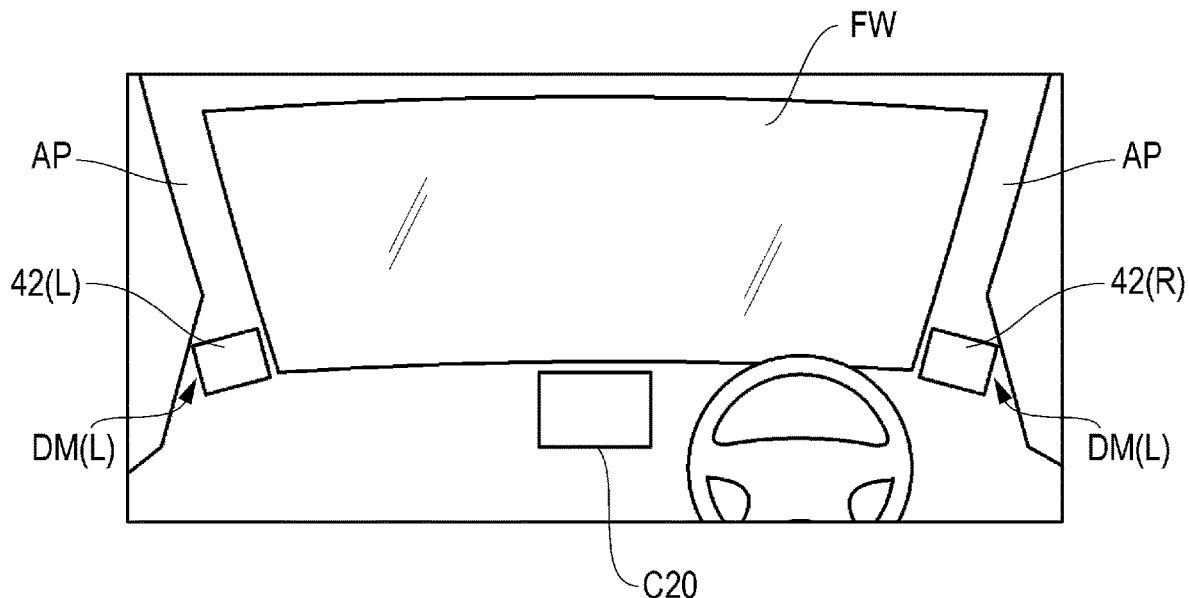
FIG. 4 is a schematic view illustrating an arrangement of a digital mirror unit.

FIG. 4 is a schematic view illustrating a periphery of a front window FW viewed from inside of the vehicle of the automobile AM1. The video signal processing unit 20, the display control unit 30, and the display unit 40 of the left imaging display unit L are integrally configured as the digital mirror unit DM and, as illustrated in FIG. 4, is provided at an A pillar AP at the left side of the automobile AM1. Also, the video signal processing unit 20, the display control unit 30, and the display unit 40 of the right imaging display unit R are integrally configured as the digital mirror unit DM and, as illustrated in FIG. 4, is provided at an A pillar AP at the right side of the automobile AM1. A main display unit C20 is provided in a center of the instrument panel. The central signal processing unit C10 is provided in the vicinity of the main display unit C20 and inside a dashboard. The central signal processing unit C10 and the video signal processing unit 20 included in the digital mirror unit DM are coupled to one another via a cable that forms the bus B. The video signal processing unit 20, the display control unit 30, and the display unit 40 are integrally configured as the digital mirror unit DM, and therefore, the video signal processing unit 20, the display control unit 30, and the display unit 40 are arranged close to one another. That is, a distance between each of the units and another one of the units is shorter than a distance between the each of the units and the central signal processing unit C10. Therefore, the above-described configuration is a configuration in which a transmission delay depending on a length of a transmission line hardly occurs between each of the video signal processing unit 20, the display control unit 30, and the display unit 40 and another one of the units. The driver is able to visually recognize the liquid crystal panel 42 of the left imaging display unit L, the liquid crystal panel 42 of the right imaging display unit R, and the display panel of the main display unit C20 in a state in which the driver sits at the drivers seat.

1-7. Operation of Imaging Display System

Figure 5:
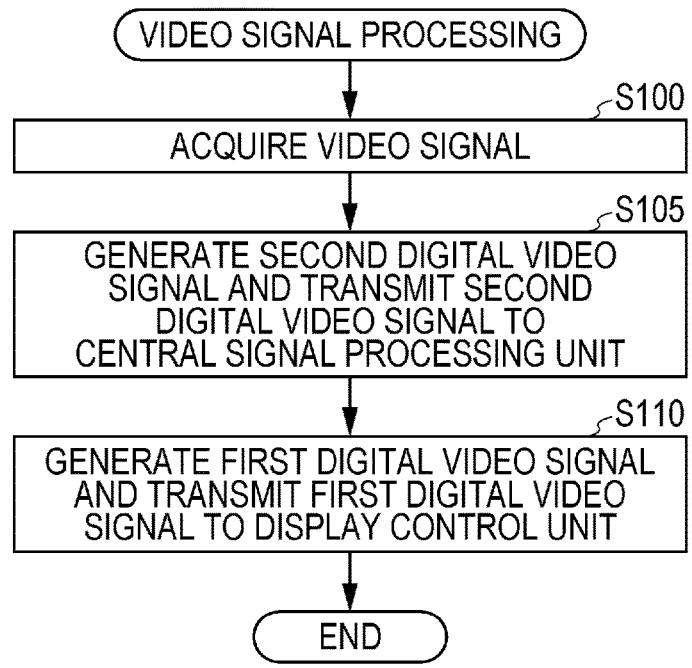
FIG. 5 is a flowchart illustrating video signal processing.

Next, with reference to FIG. 5 to FIG. 7, a flow of processing of each unit in the imaging display system 1 will be described. FIG. 5 is a flowchart illustrating video signal processing by the video signal processing unit 20. Processing illustrated in FIG. 5 is repeatedly executed by each of the left imaging display unit L and the right imaging display unit R.

The video signal processing unit 20 acquires a video signal from the imaging unit 10 (Step S100), generates the second digital video signal, based on the video signal, and transmits the second digital video signal to the central signal processing unit C10 (Step S105). Specifically, as described above, the video signal processing unit 20 performs each of steps of the pixel interpolation unit 21, the color reproduction processing unit 22, the filter processing unit 23, the gamma correction unit 24, the distortion correction unit 25, and the trimming processing unit 27 by pipeline processing. The video signal processing unit 20 outputs, as the second digital video signal, data that has undergone processing by the distortion correction unit 25 but has not undergone processing by the trimming processing unit 27 to the central signal processing unit C10 via the bus B. Subsequently, the video signal processing unit 20 generates the first digital video signal, based on the video signal, and outputs the first digital video signal to the display control unit 30 (Step S110). Specifically, the video signal processing unit 20 outputs, as the first digital video signal, data that has undergone processing by the trimming processing unit 27 to the display control unit 30.

Figure 6A:
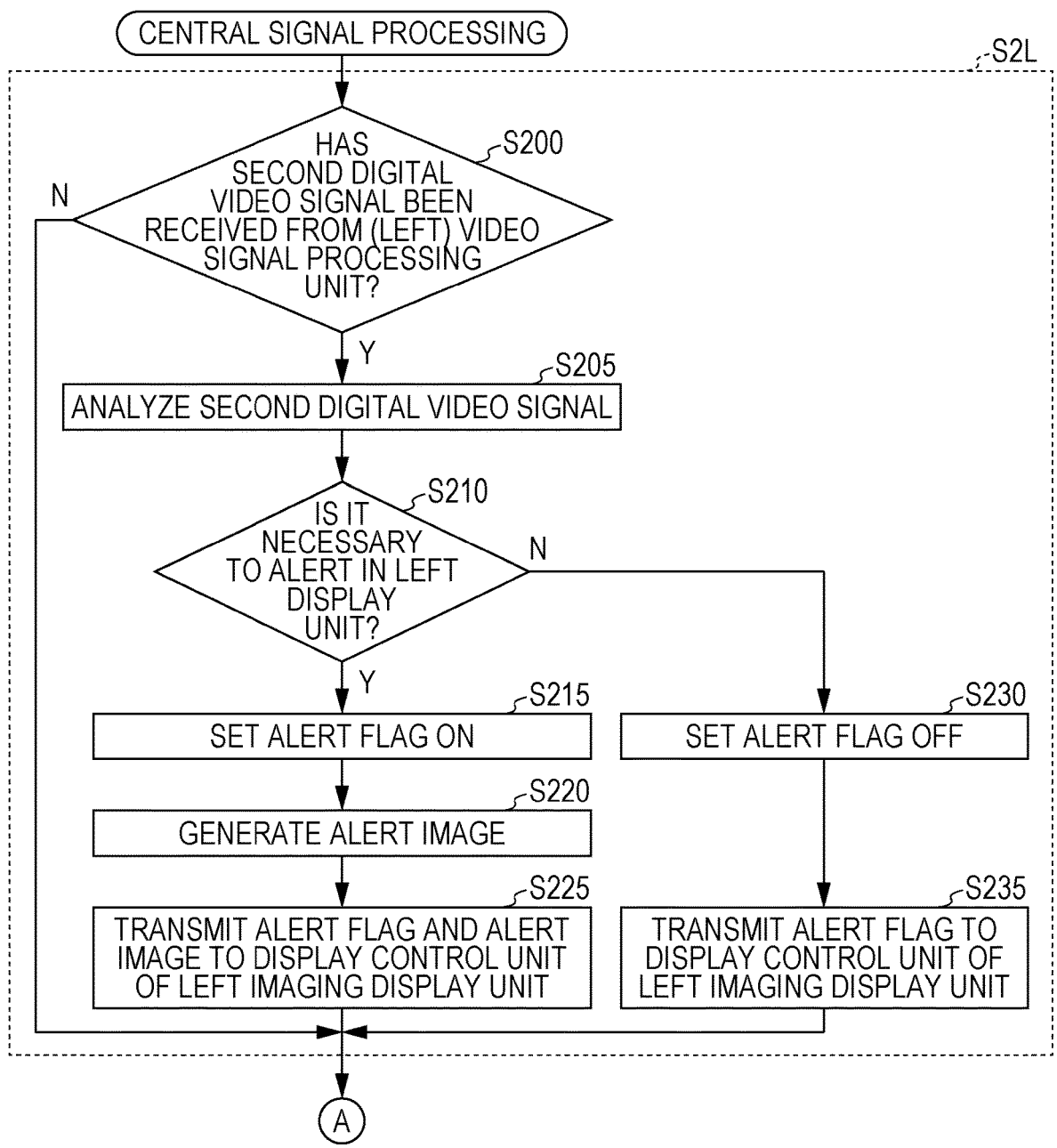
FIG. 6A and FIG. 6B are flowcharts illustrating central signal processing.
Figure 6B:
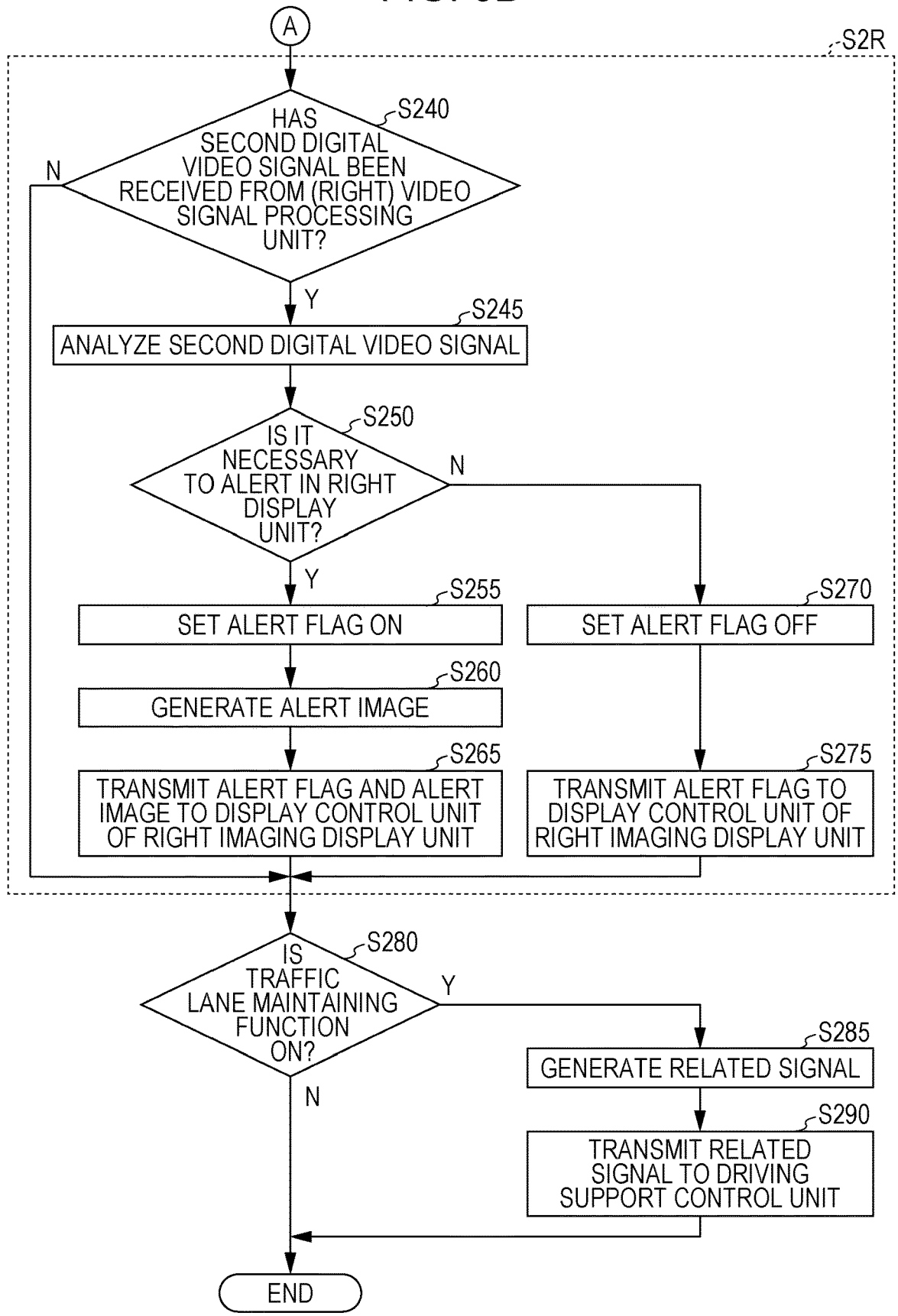

FIG. 6A and FIG. 6B are flowcharts illustrating central signal processing by the central signal processing unit C10. Processing illustrated in FIG. 6A and FIG. 6B is repeatedly executed. The acquisition unit C12 determines whether or not the communication unit C11 has received data of one frame, which includes the second digital video signal, from the video signal processing unit 20 of the left imaging display unit L (Step S200) and, if a result of the determination is N, the process proceeds to Step S240. If the result of the determination in Step S200 is Y, an image indicated by the second digital signal included in the data that has been received by the analysis unit C13 is analyzed (Step S205). For example, the analysis unit C13 analyzes whether or not an event of an alert target is included in an image of one or more consecutive frames, which have been acquired from the left imaging display unit L (Step S210). As a result of the analysis, if it has been determined that it is necessary to alert (Step S210), the analysis unit C13 sets the alert flag on (Step S215) and the alert image generation unit C131 generates an alert image (Step S220). Each of the output unit C14 and the communication unit C11 transmits the alert flag and the alert image to the display control unit 30 of the left imaging display unit L (Step S225).

An alert image is generated as an image of the same number of pixels as the number of pixels of the liquid crystal panel 42 in this embodiment. Then, a rectangular image including a character or a symbol, such as, for example, "KEEP YOUR EYES BEHIND!", which has been described above, is included in the alert image. In the alert image, besides pixels that form the rectangular image, a value that indicates that a pixel value that is indicated by the first digital video signal is to be displayed is set. In accordance with brightness of an image indicated by the second digital video signal or the like, a color of a pixel that forms the rectangular image may be changed such that the above-described rectangular image is displayed so as to be distinguishable from the image. For example, if a median of brightness of a part of an image located around an area in which a rectangular image is planned to be superimposed and displayed is lower than a threshold, a color brighter than a predetermined reference may be adopted as a color of the rectangular image and, if the image is a bright image the median of brightness of which is equal to or higher than the threshold, a color darker than the predetermined reference may be adopted. Note that the number of pixels of the alert image and the number of pixels of the liquid crystal panel 42 may be different from one another. In that case, in the alert image superimposing unit 33, the number of pixels of the alert image is converted to the number of pixels of the liquid crystal panel 42, and then, superimposition is performed.

Also, the alert image generation unit C131 may be configured to arrange a rectangular image in an alert image such that a rectangular image including a character or a symbol, such as, for example, "KEEP YOUR EYES BEHIND!" or the like is superimposed and displayed in a location that has been fixed in advance in a screen of the liquid crystal panel 42 and, another option, may be configured to change a superimposition and display location of the rectangular image in accordance with a content of an image indicated by the first digital video signal. As the latter example, for example, the superimposition and display location may be arranged in the vicinity of an image of the alert target vehicle AM2.

If it has been determined in Step S210 that it is not necessary to alert, the analysis unit C13 sets the alert flag off (Step S230) and the output unit C14 and the communication unit C11 transmit the alert flag to the display control unit 30 of the left imaging display unit L (Step S235). Processing S2L of Steps S200 to S235 is processing that corresponds to the left imaging display unit L. Processing S2R of Steps S240 to S275 is processing that corresponds to right imaging display unit R. In the processing S2R, similar processing to the processing S2L is performed. Note that, for example, if processing capacity of the central signal processing unit C10 is sufficiently high, it is possible to realize multitask in real time, or if the central signal processing unit C10 includes a plurality of analysis units C13, S205 to S220 and S230, and S245 to S260 and S270 may be performed in parallel. By performing the above-described steps in parallel, a time difference in alert detection between left and right is preferably reduced.

Subsequently, the analysis unit C13 determines whether or not the traffic lane maintaining function is on (Step S280) and, if it has been determined that the traffic lane maintaining function is on, the related signal generation unit C132 generates a related signal (Step S290) and the output unit C14 and the communication unit C11 transmit the related signal to the drive assistance control unit (not illustrated) via the bus B (Step S295). If a result of the determination in Step S280 is N, processing illustrated in FIG. 6A and FIG. 6B is terminated.

In Step S285, the analysis unit C13 derives a distance from a line (a line on a road) at the right side, which defines a driving traffic lane, to a right end of a vehicle body and a distance from a line at the left side, which defines the driving traffic lane, to a left end of the vehicle body and outputs the distances as a related signal to the drive assistance control unit. The drive assistance control unit is able to realize the traffic lane maintaining function, based on the above-described distances.

FIG. 7 is a flowchart illustrating display control processing by the display control unit 30. In each of the left imaging display unit L and the right imaging display unit R, processing illustrated in FIG. 7 is repeatedly performed. In the processing illustrated in FIG. 7, first, the acquisition unit 32 determines whether or not an alert flag (and, if it is necessary to alert, an alert image) has been received from the central signal processing unit C10 via the communication unit 50 (Step S300). An alert flag (and an alert image) is transmitted each time the central signal processing unit C10 analyzes an image of one frame. The received alert image is temporarily recorded in the frame buffer.

If it is determined in Step S300 that an alert flag (and an alert image) has been received, the alert image superimposing unit 33 determines whether or not the received alert flag is set on (Step S305). If it is determined in Step S305 that the alert flag is set on, the alert image superimposing unit 33 sets an alert state on (Step S310). If it is not determined in Step S305 that the alert flag is set on (that is, if the alert flag is set off), the alert image superimposing unit 33 sets the alert state off (Step S315).

If a result of the determination in Step S300 is N, or after Step S310 or S315 is executed if the result of the determination in Step S300 is Y, the resizing processing unit 31 determines whether or not the first digital video signal has been acquired from the video signal processing unit 20 (Step S320). That is, in Step S320, whether or not data of a necessary line for generating one line after resizing has been acquired is determined. If a result of the determination in Step S320 is N, the resizing processing unit 31 stands by until the result of the determination is Y and, if the result of the determination is Y, the resizing processing unit 31 performs resizing processing, based on the first digital video signal (Step S325).

Figure 8:
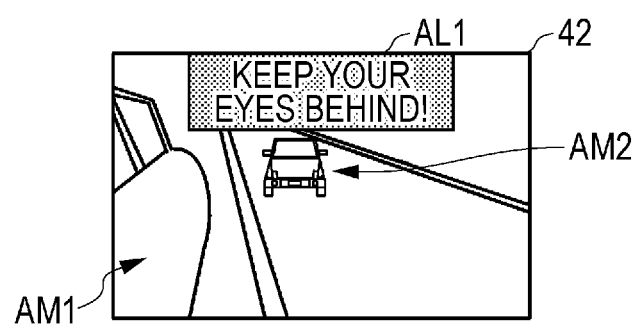
FIG. 8 is a view illustrating an example of superposition display of an alert image.

Subsequently, the alert image superimposing unit 33 determines whether or not the alert state is on (Step S330). If it is determined in Step S330 that the alert state is on, the alert image superimposing unit 33 superimposes, on data of one line after resizing, data of the corresponding line in the alert image (Step S335). The output unit 34 generates a display signal of one line in a state in which data that has undergone alert image superimposition is horizontally flipped and outputs the display signal to the display unit 40 (Step S340). As a result, for example, as illustrated in FIG. 8, it is possible to superimpose and display an alert image AL1 on the liquid crystal panel 42. If it is not determined in Step S330 that the alert state is on, the output unit 34 generates a display signal in a state in which data of one line after resizing is horizontally flipped and outputs the display signal to the display unit 40 (Step S345).

As described above, in the imaging display system 1, the central signal processing unit C10 is in charge of processing of analyzing an image that has been imaged by the imaging unit 10 and generating the third digital video signal (an alert image). The left imaging display unit L and the right imaging display unit R are in charge of processing of causing the display unit 40 of the corresponding one of the left imaging display unit L and the right imaging display unit R to display an image of outside of the vehicle, which has been imaged by the imaging unit 10, on the display unit 40 with a short display delay. The left and right imaging display units do not perform third digital video signal generation processing of which the central signal processing unit C10 is in charge. Therefore, a display delay is not increased due to an influence of high load processing, such as image recognition processing or the like, and the video signal processing unit 20 and the display control unit 30 are able to perform imaging to display with a short display delay.

Also, each of the left and right imaging display units is able to receive an alert image from the central signal processing unit C10 and superimpose and display the alert image on a display signal. Note that an alert image that is superimposed by the alert image superimposing unit 33 is an image generated based on an image of a frame that has been imaged in past from a frame that is to be displayed on the display unit 40. That is, a delay may possibly occur in display of an alert image because a time which it takes to display an alert image includes a transmission time of the second digital video signal, a processing time in the central signal processing unit C10, and a transmission time of the third digital video signal. A delay may possibly occur up to a time at which display of an alert image is performed but, in the imaging display system 1, a digital mirror in which a display delay that occurs from imaging by the light and left imaging units 10 to display by the display unit 40 is not increased may be realized.

2. Other Embodiments

Note that a technical scope of the invention is not limited to the above-described embodiment but, as a matter of course, various modifications and changes may be made to the embodiment without departing from the gist of the invention. For example, a riding device may be a device on which a person rides to drive or operate and, for example, an automobile, a two-wheeled vehicle, a vehicle of a railroad vehicle or the like, a watercraft, an aircraft or the like may be assumed. Also, the transmission line in the riding device may be a transmission line used for performing a communication between electronic parts mounted on the riding device and the transmission line may be a wired transmission line or a wireless transmission line. Also, there may be a case in which some of elements included in the imaging display system are not mounted in the riding device (may be provided in a remote location). Also, as described in the above-described embodiment, the transmission line in the riding device may be a bus to which a plurality of electronic parts is coupled and via which communications of various signals are performed or may be an exclusive transmission line via which two electronic parts are coupled to one another in one-to-one correspondence.

Each step performed in the video signal processing unit 20 may be performed by pipeline processing using a line buffer, as described in the above-described embodiment, but each step may be performed after data of one frame has been stored using a frame buffer. Also, the contents and order of processes performed in the video signal processing unit 20 area not limited to those described in the above-described embodiment. Any one of the steps may be omitted or another step may be added. For example, the distortion correction unit 25 may be omitted. Also, for example, if the numbers of pixels in the horizontal direction and the vertical direction after trimming by the trimming processing unit 27 are the same or substantially the same as the numbers of pixels in the horizontal direction and the vertical direction of the liquid crystal panel 42, the resizing processing unit 31 may be omitted. Also, for example, a processing unit that performs at least one of first processing and second processing, which will be described below, may be added. The first processing is processing in which an area close to a vehicle body is relatively increased in size, as compared to an area distant from the vehicle body, in the left-and-right direction of an image based on a video signal. The second processing is processing in which a center area is relatively increased in size, as compared to an area located above or below of the center area, in the up-and-down direction of an image based on a video signal.

The first digital video signal and the second digital video signal may be the same. That is, the first digital video signal and the second digital video signal may be the same in the sense that a range of an image indicated by the first digital video signal and a range of an image indicated by the second digital video signal are the same. As another option, if transmission of the first digital video signal from the video signal processing unit to the display control unit is performed via the transmission line in the riding device, the first digital video signal and the second digital video signal may be the same in the sense that formats of data that is transmitted are the same, in addition to the sense that the ranges of the images are the same.

The range of an image indicated by the first digital video signal and the range of an image indicated by the second digital video signal may be partially different from one another, as described in the above-described embodiment, may be totally different from one another, or may be all the same. Also, for an image that has been imaged by the imaging unit, a range which is displayed on the display unit and a range in which the central signal processing unit is caused to process may be variably set.

The video signal processing unit may be configured to receive a video signal from the imaging unit via the transmission line of in the riding device. Also, the display control unit may be configured to receive a digital video signal from the video signal processing unit via the transmission line of in the riding device. Also, the display unit may be configured to receive a display signal from the display control unit via the transmission line of in the riding device.

As long as the central signal processing unit is configured to generate a third digital video signal related to a digital video signal that has been received from the video signal processing unit and output the third digital video signal to the display control unit via the transmission line of in the riding device and the display control unit is configured to generate a display signal, based on the digital video signal that has been received from the video signal processing unit and the third digital video signal and output the display signal to the display unit, various configurations may be employed. For example, the display control unit may be configured to display an image that is indicated by the digital video signal that has been received from the video signal processing unit in a first area in a display area of the display unit and generate a display signal such that an image that is indicated by the third digital video signal that has been received from the central signal processing unit is displayed in a second area that is different from the first area in the display area.

As long as the display control unit is configured to superimpose the third digital video signal that has been received from the central signal processing unit on the digital video signal that has been received from the video signal processing unit to generate a display signal, various configurations may be employed. Other than superimposing an alert image in which a character or a symbol is indicated, as described in the above-described embodiment, for example, a surrounding frame which surrounds an alert target vehicle included in the second digital video signal may be superimposed as an alert image. For example, the central signal processing unit may be configured to estimate a location of the alert target vehicle AM2 in an image in a frame in which the surrounding frame is superimposed and displayed, based on the size and orientation of a motion vector of the alert target vehicle AM2 using the automobile AM1 as a reference, a transmission time of transmission between the imaging display unit and the central signal processing unit C10, a processing time of the central signal processing unit C10, or the like and generate, as an alert image, a surrounding frame which is located in such a location and has such a size that the above-described location is included in the surrounding frame. An alert image may be in any format, as long as the surrounding frame may be superimposed and displayed in a designated location and with a designated size. An alert image may be data in bitmap format and, as another alternative, may be data in vector format. Note that a configuration according to the invention is not limited to a configuration in which an alert image is an image having pixels of the same number as the number of pixels of the liquid crystal panel 42. An alert image may be a rectangular image including a character string, such as, for example, "KEEP YOUR EYES BEHIND!" or may be only a part of an image in which the above-described surrounding frame is indicated. In that case, information indicating the superimposition and display location of the alert image may be transmitted from the alert image generation unit C131 together with the alert image.

Also, the central signal processing unit may be configured to generate, for example, if an alert target vehicle is not included in the image i1 but is included in the image i2, an alert image including an image obtained by trimming an image of the alert target vehicle and transmit the alert image to the display control unit of the imaging display unit.

Note that the display control unit may be configured to hold an alert image in a memory in advance, and superimpose and display, when the display control unit is instructed to display an alert image by the central signal processing unit, the alert image that is held in the memory on a digital video signal that has been received from the video signal processing unit.

Also, if the imaging display system includes a plurality of imaging device units each of which includes at least the imaging unit and the video signal processing unit, the central signal processing unit may be configured to receive a digital video signal that has been output from each of video signal processing units of the plurality of imaging device units via the transmission line in the riding device, generate a related signal that is related to a plurality of digital signals that have been received, and output the related signal via the transmission line in the riding device. For example, as in the above-described embodiment, a configuration in which information related to the traffic lane maintaining function is output as a related signal may be employed or a configuration in which an around view image (a top view image) is generated and the image is output as a related signal, for example, to the main display unit C20 may be employed. In order to generate an around view image, the imaging display system 1 may be configured to include, in addition to the imaging unit that images a view at a left side of the automobile AM1 and a view at a right side of the automobile AM1, a plurality of imaging units (for example, imaging units that image a front side of the automobile AM1 and a rear side of the automobile AM1) which are used for imaging views around the automobile AM1 without blind spots.

Note that a digital mirror unit (the video signal processing unit, the display control unit, and the display unit) which corresponds to the imaging unit that images the rear side of the automobile AM1 may be further included. The digital mirror unit which corresponds to the imaging unit that images the rear side of the automobile AM1 may be arranged, instead of a known rearview mirror, in an upper center part or a lower center part of the front window FW. The imaging display unit including the imaging unit that images the front side of the automobile AM1 may be configured to include the video signal processing unit that corresponds to the imaging unit but not to include an exclusive display control unit or display unit used for displaying the front side of the automobile AM1.

Note that a configuration in which the related signal that has been generated by the central signal processing unit is output not via the transmission line in the riding device, which has been used for transmission and reception of the second digital video signal or the third digital video signal may be employed. For example, the related signal that has been generated by the central signal processing unit may be output to another electronic part via a different bus from a bus that has been used for transmission and reception of the second digital video signal or the third digital video signal and, as another option, may be output to another electronic part coupled to the central signal processing unit in one-to-one correspondence via an exclusive transmission line. For example, as illustrated in FIG. 1, the central signal processing unit C10 and the main display unit C20 may be coupled to one another via an exclusive transmission line.

Also, the function of each of the units described in claims is realized by a hardware resource in which a function is specified by a configuration itself, a hardware resource in which a function is specified by a program, or a combination of the resources. Also, the function of each of the units is not limited to a function that is realized by a hardware resource that is physically independent from another one of the respective functions of the units.

The entire disclosure of Japanese Patent Application No. 2017-020133 filed Feb. 7, 2017 is expressly incorporated by reference herein.

What is claimed is:

1. An imaging display system comprising:
   a first image sensor that images an image of outside of a device mounted with the first image sensor and outputs a video signal that indicates the image;
   a first hardware video signal processing unit that receives the video signal from the first image sensor and outputs (i) a first digital video signal based on the video signal via a first connection and (ii) a second digital video signal based on the video signal via a second connection different from the first connection;
   a hardware signal processing unit that receives the first digital video signal from the first hardware video signal processing unit via the first connection, analyzes the first digital video signal, generates an alert signal that indicates an event of an alert target related to the first digital video signal, and outputs the alert signal;
   a hardware display control unit that (i) receives the second digital video signal from the first hardware video signal processing unit via the second connection, (ii) receives the alert signal from the hardware signal processing unit, (iii) generates a display signal based on the second digital video signal and the alert signal, and (iv) outputs the display signal; and
   a display that displays an image that is indicated by the display signal.

2. The imaging display system according to claim 1, wherein
   the first digital video signal and the second digital video signal are different from one another.

3. The imaging display system according to claim 2,
   wherein a range of an image that is indicated by the first digital video signal is partially different from a range of an image that is indicated by the second digital video signal.

4. The imaging display system according to claim 1,
   wherein the first hardware video signal processing unit, the hardware display control unit, and the display are integrally configured and the first hardware video signal processing unit and the hardware signal processing unit are coupled to one another via a cable that forms a transmission line in the device, the transmission line including the first connection.

5. The imaging display system according to claim 1, wherein a distance between (i) each of the first hardware video signal processing unit, the hardware display control unit, and the display and (ii) a second hardware video signal processing unit, a second hardware display control unit, and a second display is shorter than a distance between (i) each of the first hardware video signal processing unit, the hardware display control unit, and the display and (ii) the hardware signal processing unit.

6. The imaging display system according to claim 1, further comprising:
a plurality of imaging device units each of which includes at least an image sensor and a hardware video signal processing unit, one of the plurality of imaging device units including the first image sensor and the first hardware video signal processing unit,
wherein the hardware signal processing unit (i) receives the first digital video signal that has been output from each of the hardware video signal processing units of the plurality of imaging device units via a transmission line, that includes the first connection, in the device, (ii) generates a related signal related to the plurality of the first digital video signals which have been received, and (iii) outputs the related signal via the transmission line in the device.

7. The imaging display system according to claim 1, wherein the image indicated by the display signal includes a first image that is indicated by the second digital video signal and a second image that is indicated by the alert signal, and
the display includes a first area and a second area different from the first area, the first area displays the first image, and the second area displays the second image.

8. The imaging display system according to claim 1, wherein the alert signal includes an alert flag.

9. An imaging display system comprising:
an image sensor that images an image of outside of a device mounted with the image sensor and outputs a video signal that indicates the image;
a hardware video signal processing unit that receives the video signal from the image sensor and outputs (i) a first digital video signal based on the video signal via a first connection and (ii) a second digital video signal based on the video signal via a second connection different from the first connection;
a hardware signal processing unit that receives the first digital video signal from the hardware video signal processing unit via the first connection, analyzes the first digital video signal, generates an alert signal that indicates an event of an alert target related to the first digital video signal, and outputs the alert signal;
a hardware display control unit that (i) receives the second digital video signal from the hardware video signal processing unit via the second connection, (ii) generates a display signal based on the second digital video signal, and (iii) outputs the display signal;
a display that displays an image that is indicated by the display signal; and
a speaker that outputs an alert sound or a word that indicates the alert signal from the hardware signal processing unit.

10. An imaging display system comprising:
an image sensor that images an image of outside of a device mounted with the image sensor and outputs a video signal that indicates the image;
a hardware video signal processing unit that receives the video signal from the image sensor and outputs (i) a first digital video signal based on the video signal via a first connection and (ii) a second digital video signal based on the video signal via a second connection different from the first connection;
a hardware signal processing unit that receives the first digital video signal from the hardware video signal processing unit via the first connection, analyzes the first digital video signal, generates a related signal that is related to assistance control based on the first digital video signal, and outputs the related signal;
a hardware display control unit that (i) receives the second digital video signal from the hardware video signal processing unit via the second connection, (ii) generates a display signal based on the second digital video signal, and (iii) outputs the display signal;
a display that displays an image that is indicated by the display signal based on the second digital video signal; and
a hardware drive assistance control unit that controls the device based on the related signal from the hardware signal processing unit.

11. A device comprising:
the imaging display system according to claim 1 mounted therein.

12. A device comprising:
the imaging display system according to claim 2 mounted therein.

13. A device comprising:
the imaging display system according to claim 3 mounted therein.

14. A device comprising:
the imaging display system according to claim 4 mounted therein.

15. A device comprising:
the imaging display system according to claim 5 mounted therein.

16. A device comprising:
the imaging display system according to claim 6 mounted therein.

17. A device comprising:
the imaging display system according to claim 7 mounted therein.

18. A device comprising:
the imaging display system according to claim 8 mounted therein.

19. A device comprising:
the imaging display system according to claim 9 mounted therein.

20. A device comprising:
the imaging display system according to claim 10 mounted therein.

* * * * *